United States Patent
Moon et al.

(10) Patent No.: US 10,660,107 B2
(45) Date of Patent: May 19, 2020

(54) METHOD OF AVOIDING WI-FI INTERFERENCE USING CHANNEL STRUCTURE CHARACTERISTICS AND BLUETOOTH APPARATUS USING SAME

(71) Applicant: ABOV Semiconductor co., Ltd., Cheongju-si, Chungcheongbuk-do (KR)

(72) Inventors: Ki Tae Moon, Seoul (KR); Sang Young Chu, Bucheon-si (KR); Suk Kyun Hong, Seoul (KR)

(73) Assignee: ABOV Semiconductor co., Ltd., Cheongju-si, Chungcheongbuk-do (KR)

( * ) Notice: Subject to any disclaimer, the term of this patent is extended or adjusted under 35 U.S.C. 154(b) by 0 days.

(21) Appl. No.: 16/039,363

(22) Filed: Jul. 19, 2018

(65) Prior Publication Data

US 2019/0029023 A1    Jan. 24, 2019

(30) Foreign Application Priority Data

Jul. 20, 2017    (KR) ........................ 10-2017-0092147

(51) Int. Cl.
*H04W 72/08* (2009.01)
*H04W 4/80* (2018.01)
*H04W 84/18* (2009.01)
*H04W 84/12* (2009.01)

(52) U.S. Cl.
CPC .......... *H04W 72/082* (2013.01); *H04W 4/80* (2018.02); *H04W 84/18* (2013.01); *H04W 84/12* (2013.01)

(58) Field of Classification Search
CPC ..... H04W 72/082; H04W 84/18; H04W 4/80; H04W 84/12
See application file for complete search history.

(56) References Cited

U.S. PATENT DOCUMENTS

2016/0105349 A1* 4/2016 Zhu .................... H04W 4/80
370/252

FOREIGN PATENT DOCUMENTS

KR    10-2013-0009489 A1    1/2013

* cited by examiner

*Primary Examiner* — Dady Chery

(57) ABSTRACT

Bluetooth apparatus includes a control unit and a Bluetooth communication unit. The control unit divides Bluetooth channels into divided groups including a first group, a second group, and a third group and selects one from among the divided groups. The Bluetooth communication unit uses channels included in the selected divided group, in which the selected divided group does not include a frequency band of a Wi-Fi channel in use.

6 Claims, 7 Drawing Sheets

METHOD OF AVOIDING WI-FI INTERFERENCE USING CHANNEL STRUCTURE CHARACTERISTICS AND BLUETOOTH APPARATUS USING SAME

CROSS REFERENCE TO RELATED APPLICATION

This application claims priority under 35 U.S.C. § 119 to Korean Patent Application No. 10-2017-0092147, filed on Jul. 20, 2017 in the Korean Intellectual Property Office, the disclosure of which is incorporated by reference herein in its entirety.

TECHNICAL FIELD

The present invention relates to a method of avoiding Wi-Fi interference using channel structure characteristics and a Bluetooth apparatus using the same. More particularly, the present invention relates to a method of avoiding Wi-Fi interference in a Bluetooth apparatus on a basis of frequency band structure and occupancy characteristics of Bluetooth and Wi-Fi channels, and a Bluetooth apparatus using the method.

DESCRIPTION OF THE RELATED ART

A 2.4 GHz frequency band used by the Bluetooth standard is an industrial scientific medical (ISM) band that can be used without prior permission, in which various wireless communication standards coexist. Bluetooth and Wi-Fi may be exemplified as a typical wireless communication standard for the 2.4 GHz ISM band.

In order to minimize interference between Bluetooth signals, the Bluetooth communication standard uses a frequency hopping method of transmitting a transmission signal while hopping a frequency band at a specific period. Also, an adaptive frequency hopping method in which a channel having poor quality due to various interference signals is excluded from frequency hopping can be used. The standard recommends using a channel assessment algorithm that is unique to a manufacturer, in order to discriminate channels having poor quality.

The Wi-Fi communication standard uses a Carrier Sense Multiple Access/Collision Avoidance (CSMA/CA) method as a protocol of a Medium Access Control (MAC) layer, in order to minimize interference between Wi-Fi signals. The CSMA/CA method is performed by determining whether or not there is a signal occupying the channel, and then before transmitting a signal to the transmission channel. Herein, the signal is transmitted when there is no signal occupying the channel, and the signal is retransmitted after delaying transmission thereof by a random time when there is signal occupying the channel.

As described above, many technologies for minimizing interference have been known to minimize interference in wireless communication standards such as Bluetooth and Wi-Fi. As disclosed in Korean Patent Application Publication No. 2015-0144511, methods of measuring a quality value of Bluetooth channel overlapped with each Wi-Fi channel to minimize interference are mainly used. A method of minimizing signal interference between communication standards is not provided considering channel structure and occupancy characteristics of each wireless communication standard. In addition, based on the quality value of the channel or using the frequency hopping method, there are problems that an amount of calculation is increased and thus unnecessary connection delay occurs.

SUMMARY OF THE INVENTION

Accordingly, the present invention has been made keeping in mind the above problems occurring in the prior art, and an object of the present invention is to provide a method of avoiding signal interference between Bluetooth and Wi-Fi communication standards based on channel structure and occupancy characteristic of Bluetooth and Wi-Fi communication standard, and a Bluetooth apparatus using the method.

In order to achieve the object, according to an embodiment of the present invention, there is provided a Bluetooth apparatus, the apparatus including: a control unit dividing Bluetooth channels into at least three groups including a first group, a second group, and a third group and selecting one from among the divided groups; and a Bluetooth communication unit using channels included in the selected group, in which the selected group does not include a frequency band of a Wi-Fi channel in use.

The respective first, second, and third groups may include respective frequency bands of three Wi-Fi channels that do not overlap each other, in which the respective groups may be divided such that the frequency bands do not overlap each other.

The apparatus may further include a Wi-Fi communication unit, wherein the control unit selects a group that does not include a frequency band of a channel used by the Wi-Fi communication unit.

The control unit may receive information on the Wi-Fi channel in use and select one from among the divided groups on a basis of the received information.

The control unit may discriminate a channel that is subject to strong Wi-Fi interference using a channel assessment algorithm and select one from among the divided groups on a basis of the discriminated information.

In order to achieve the object, according to another embodiment of the present invention, there is provided a method of avoiding Wi-Fi interference, the method including: dividing Bluetooth channels into at least three groups including a first group, a second group, and a third group; selecting one that does not include a frequency band of a Wi-Fi channel in use from among the divided groups; and using a channel included in the selected group.

The respective first, second, and third groups may include respective frequency bands of three Wi-Fi channels that do not overlap each other, in which the respective groups may be divided such that the frequency bands do not overlap each other.

The method may further include receiving information on the Wi-Fi channel in use.

The method may further include discriminating a channel that is subject to strong Wi-Fi interference using a channel assessment algorithm, wherein the selecting may be performed by selecting one from among the divided groups on a basis of the discriminated channel information.

As described above, according to the present embodiments, the Bluetooth channels are divided into a plurality of groups on a basis of frequency band structure and occupancy characteristics, and channels of a group that does not include the frequency band of the Wi-Fi channel in use are caused to be used for Bluetooth communication, whereby there is an advantage of solving a problem of an unnecessary connection delay caused in a conventional Bluetooth apparatus using methods such as a channel quality value calculation and frequency hopping.

In addition, the respective groups of Bluetooth channels include respective frequency bands of three Wi-Fi channels that do not overlap each other, in which the respective groups are divided such that frequency bands do not overlap each other. Accordingly, there is an advantage that at least one group is not subject to interference caused by any certain Wi-Fi channel to allow a Bluetooth channel to be easily and quickly assigned. Accordingly, this is particularly effective to be used in homes or small offices that use Wi-Fi AP of single frequency.

BRIEF DESCRIPTION OF THE DRAWINGS

These and other features of the present inventive concept will become more apparent by describing in detail exemplary embodiments thereof with reference to the accompanying drawings of which.

DETAILED DESCRIPTION OF EXEMPLARY EMBODIMENTS

Hereinafter, embodiments of the present invention will be described in detail with reference to the accompanying drawings so that those skilled in the art can easily carry out the present invention. In the following description, only portions necessary for understanding the operation according to the embodiment of the present invention are shown and described, and the description and the other portions of the drawings are omitted so as not to obscure the gist of the present invention. The present invention may, however, be embodied in many different forms and should not be construed as limited to the embodiments set forth herein.

It is also to be understood that the terms and words used in the following description and claims should not be construed as limited to ordinary or dictionary meanings and should be construed as having a meaning and concept consistent with the technical idea of the present invention so as to express the present invention most appropriately.

Throughout the specification, when a part is referred to as being "connected" to another part, it is not limited only to a case where they are "directly connected," but a case where they are "electrically connected" with another part in between. Also, when a portion "includes" a component, it means to include other components, not exclude other components, unless specifically stated otherwise.

For simplicity of explanation, one or more methods are shown and described herein as a series of steps, for example in a form of a flowchart or flowchart, but the invention is not limited by the order of the steps. It is because the present invention may be done in a different order than that shown and described herein in accordance with the present invention or concurrently with other steps. Moreover, not all illustrated steps must be implemented in accordance with the present invention.

In describing various embodiments of the present invention, corresponding elements are denoted by the same names and the same reference numerals. In order to explain the embodiments of the present invention, the sizes of components, the thicknesses of lines, and the like may be exaggerated for convenience of understanding.

The present invention has been made to solve the problem that an unnecessary connection delay occurs due to complicated calculation and process such as channel quality value calculation and frequency hopping in a conventional Bluetooth apparatus. In order to solve this problem, the present invention proposes a method of minimizing signal interference between communication standards in consideration of channel structure and occupancy characteristics of each wireless communication standard.

First, the channel structure and occupancy characteristics of Bluetooth and Wi-Fi will be described.

Figure 1:
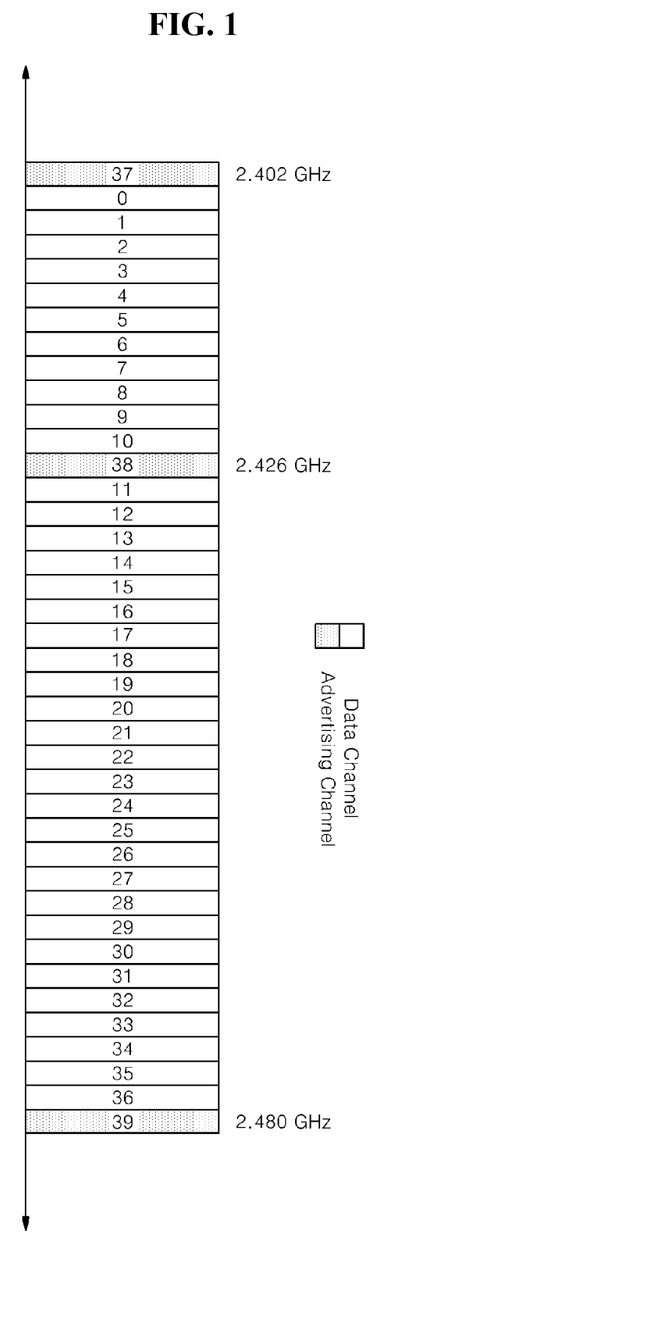
FIG. 1 is a diagram illustrating a channel structure of Bluetooth in a 2.4 GHz ISM band.
Figure 2:
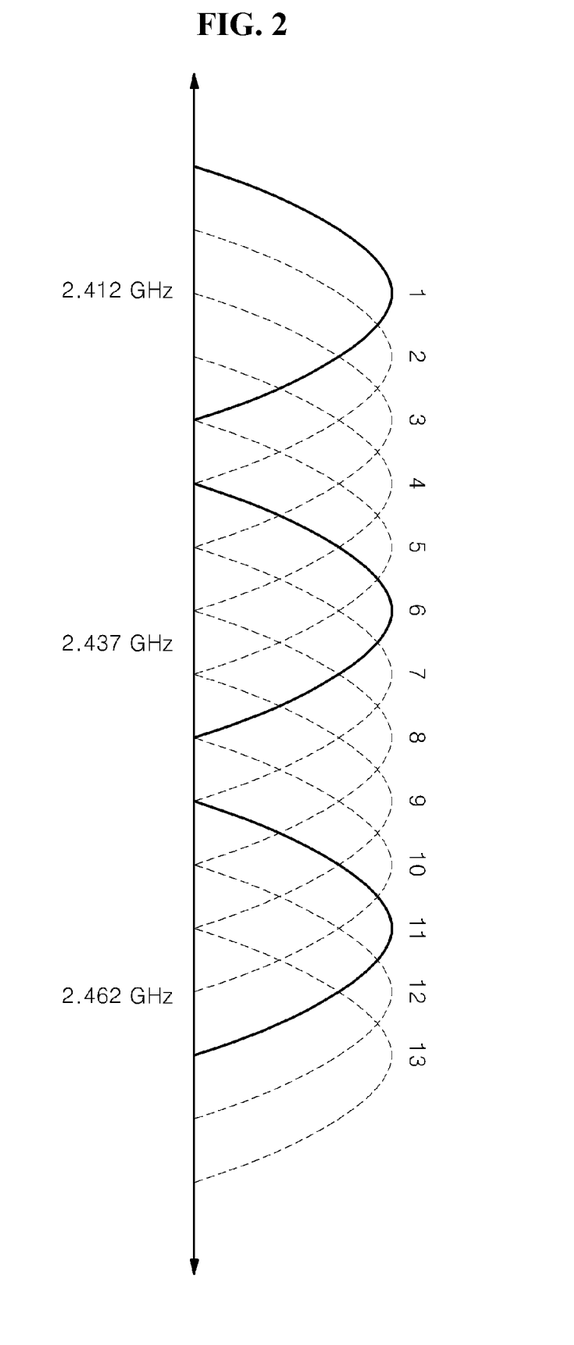
FIG. 2 is a diagram showing a channel structure of Wi-Fi in the 2.4 GHz ISM band.

FIG. 1 is a diagram illustrating a channel structure of Bluetooth on a 2.4 GHz ISM band, and FIG. 2 is a diagram showing a channel structure of Wi-Fi on a 2.4 GHz ISM band.

Referring to FIG. 1, each channel band of Bluetooth Smart or Bluetooth Low Energy (BLE) is shown, which is configured with 40 channels having 2 MHz of a bandwidth and an interval between center frequencies.

Among the 40 channels, three channels 37, 38 and 39, for example, are used for an advertising channel, and the other 37 channels are used for data channels. The Bluetooth Smart is configured with 40 channels of $2402+k*2$ MHz ($k=0, 1, \ldots, 39$), considering the channel based on the center frequency. For reference, a Bluetooth Classic is configured with 79 channels of $2402+k*1$ MHz ($k=0, 1, \ldots, 78$).

Referring to FIG. 2, each channel band of the Wi-Fi is shown.

Each Wi-Fi channel is provided such that a center frequency thereof is disposed at 5 MHz intervals, and approximately 13 channels overlap each other. A bandwidth of 802.11b is 22 MHz wide, and a bandwidth of 802.11g is 20 MHz wide. In the case of 802.11n, a bandwidth is basically 20 MHz wide. Wi-Fi may simultaneously use three channels that do not overlap in bandwidth among 13 channels.

Considering a general characteristic relating to channel occupancy, in a home or a small office using a Wi-Fi AP of single frequency, it is common to select one among from channels 1, 6, and 11, but is not limited thereto.

Next, a method of dividing the Bluetooth channel into a plurality of groups on a basis of channel structure and occupancy characteristics as seen in FIGS. 1 and 2 will be described.

Figure 3:
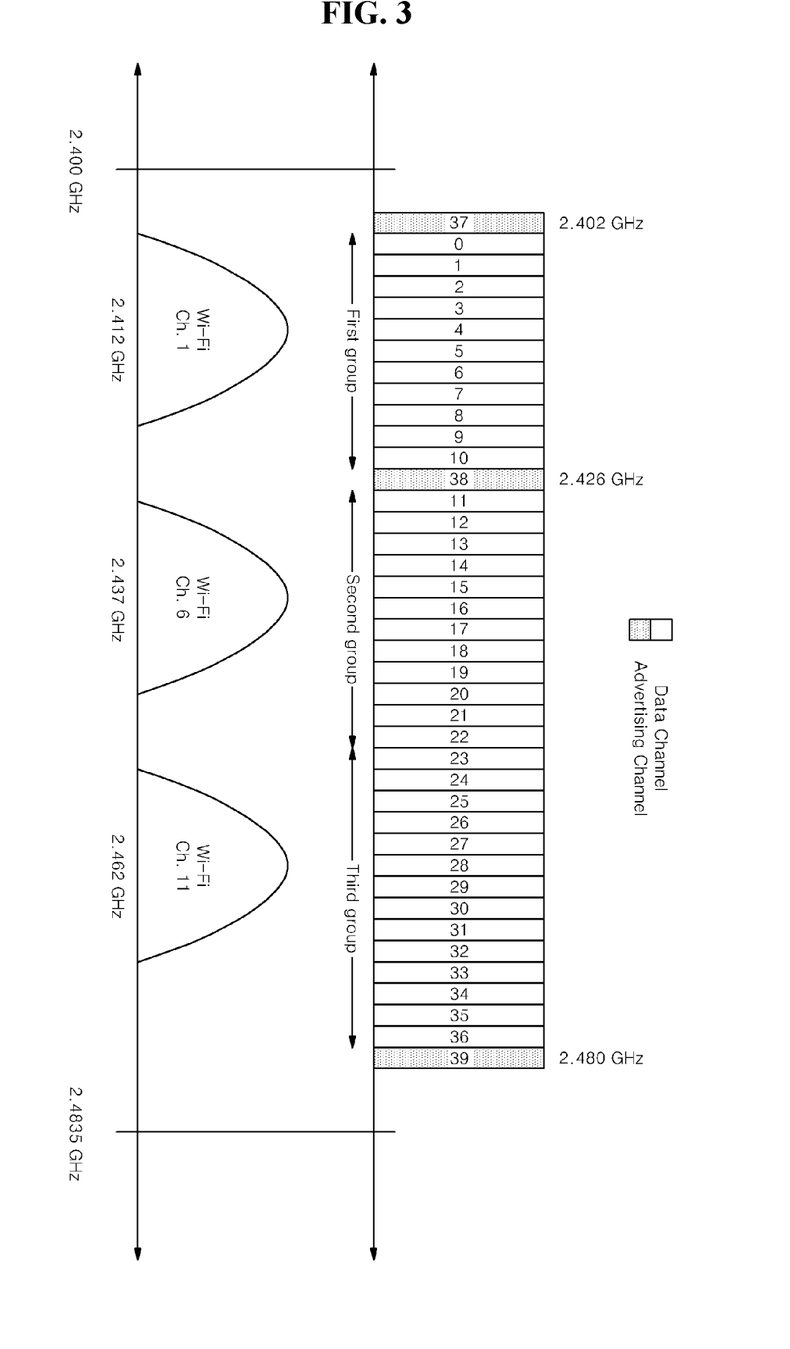
FIGS. 3 and 4 are diagrams illustrating division of Bluetooth data channels into three frequency bands according to various embodiments of the present invention.
Figure 4:
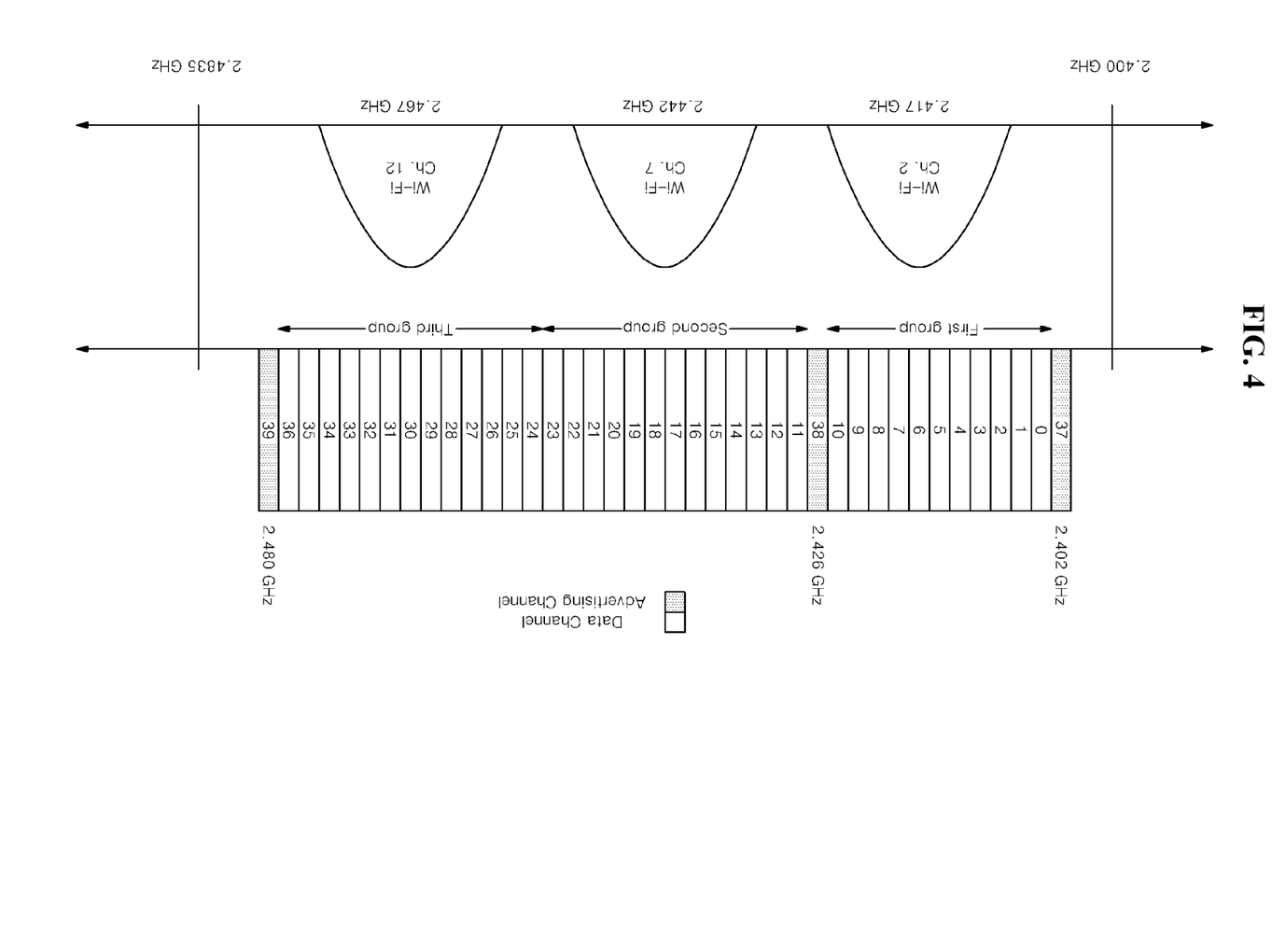

FIGS. 3 and 4 are diagrams illustrating division of a Bluetooth data channel into at least three frequency bands according to various embodiments of the present invention.

First, it is necessary to select three Wi-Fi channels that do not overlap each other. As shown in FIG. 3, channel 1, channel 6, and channel 11 of the Wi-Fi may be considered. The Bluetooth channel may be divided into three groups based on these 3 channels that do not overlap each other.

Since the channels 37, 38, and 39 that are Bluetooth advertising channels e, are already positioned at positions that do not overlap the channels 1, 6, and 11 of Wi-Fi, the Bluetooth data channels may be divided into three groups.

The three divided frequency bands are shown as a first group, a second group, and a third group, respectively, and each frequency band is caused to include the channel 1, the channel 6, and the channel 11 of the Wi-Fi, respectively. That is, the first group may be segmented into channels 0 to 10, the second group may be segmented into channels 11 to 22, and the third group may be segmented into channels 23 to 36.

Although the second group may be segmented into 11 to 21 and the third group may be segmented into 22 to 36, the present invention is not limited thereto and may be segmented into various groups. Also, it may also be segmented into more groups.

In addition, the data channel and the advertising channel may be separately used. For example, the advertising channel may be divided into a plurality of groups separately from the data channel. The embodiment of FIG. 3 is configured such that the data channels are divided into three groups and the advertising channels are divided into three groups.

As described above, the respective groups of Bluetooth data channels includes the respective frequency bands of three Wi-Fi channels that do not overlap each other. When each group is divided such that the frequency bands do not overlap each other, at least one group will not be subject to interference from any Wi-Fi channel.

Accordingly, by using Bluetooth channels in a group that is not subject to Wi-Fi interference, it is possible to easily and quickly assign a Bluetooth channel that is not subject to Wi-Fi interference.

For example, when a Wi-Fi AP channel in use is channel 1, the Bluetooth apparatus may avoid Wi-Fi interference by using channels of the second group and the third group. Similarly, when the Wi-Fi AP channel is channel 6, the Bluetooth apparatus may avoid the Wi-Fi interference by using channels of the first group and the third group, and when the Wi-Fi AP channel is channel 11, the Bluetooth apparatus may avoid the Wi-Fi interference by using channels of the first group and the second group.

In addition, it is possible to select a group that avoids Wi-Fi interference even when using an arbitrary Wi-Fi channel, besides the Wi-Fi channels 1, 6, and 11 that are based on dividing the first, second, and third groups. For example, when the Wi-Fi channel 4 is used, the third group of Bluetooth channels that do not include the frequency band of the channel 4 (i.e., do not overlap) may be used. Similarly, the third group of Bluetooth channels may be used even though the Wi-Fi channel 5 is used, and the first group of Bluetooth channels may be used when the Wi-Fi channel 8 is used.

As another embodiment, referring to FIG. 4, Wi-Fi channels 2, 7, and 12 may be considered. Based on these three channels, the Bluetooth channels may be divided into three groups. The three frequency bands are shown as a first group, a second group, and a third group, respectively, in which each frequency band may include respective bands of Wi-Fi channel 2, channel 7, and channel 12 of the Wi-Fi. That is, the first group may be segmented into channels 0 to 10, the second group may be segmented into channels 11 to 23, and the third group may be segmented into 24 to 36 channels.

It is also possible to make groups of various combinations based on three Wi-Fi channels that do not overlap each other, such as Wi-Fi channels 1, 6, and 12, Wi-Fi channels 1, 7 and 13, and Wi-Fi channels 2, 7, and 13.

As in the above embodiment, the respective groups of Bluetooth channels include the respective frequency bands of three Wi-Fi channels that do not overlap each other. When the groups are divided such that the frequency bands do not overlap each other, at least one group is not subject to interference caused by any certain Wi-Fi channel. Accordingly, by using Bluetooth channels included in at least one group that is not subject to Wi-Fi interference, it is possible to assign Bluetooth channels that are not subject to Wi-Fi interference easily and quickly. Particularly, this is very effective to be used in a home or a small office that uses Wi-Fi AP of single frequency.

Figure 5:
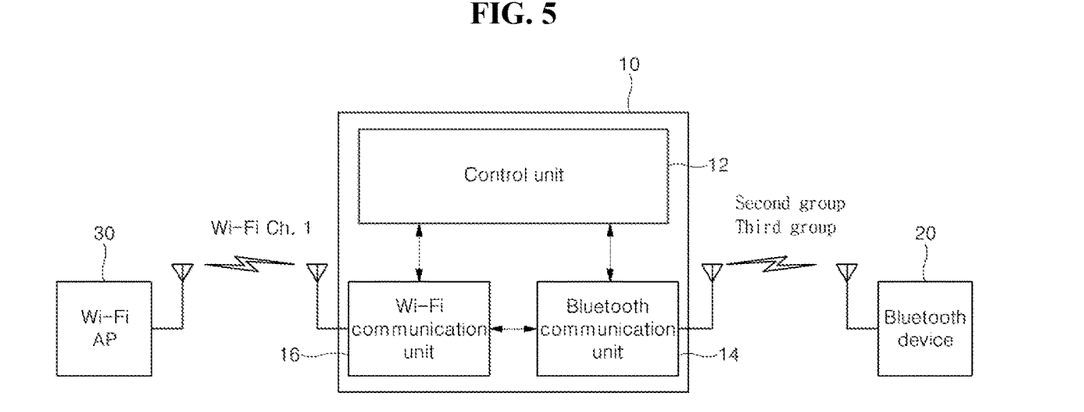
FIG. 5 is a block diagram illustrating an apparatus for simultaneously supporting Wi-Fi as a Bluetooth apparatus according to another embodiment of the present invention.

FIG. 5 is a block diagram illustrating an apparatus for simultaneously supporting Wi-Fi as a Bluetooth apparatus according to another embodiment of the present invention.

Referring to FIG. 5, the Bluetooth apparatus 10 according to the present invention may include a control unit 12, a Bluetooth communication unit 14, and a Wi-Fi communication unit 16. The Bluetooth apparatus 10 further includes a memory and the like, but is omitted in order to illustrate only parts necessary for understanding the operation according to the embodiment of the present invention. In addition, FIG. 5 shows a Bluetooth device 20 for performing Bluetooth communication and a Wi-Fi AP 30 for performing Wi-Fi communication, as external devices that communicates with the Bluetooth apparatus 10.

The Bluetooth apparatus 10 may be an independent apparatus, and may be an apparatus, a device, a module, and a system-on-chip (SoC), but not limited thereto, provided in various devices such as a mobile phone, a smart phone, a computer, a tablet, a PC, and the like.

The control unit 12 is provided to control the Bluetooth communication unit 14 and the Wi-Fi communication unit 16, and divides the Bluetooth channels into at least three groups including the first group, the second group, and the third group and selects one from among the divided groups, as described with reference to FIGS. 3 and 4. The control unit 12 may cause the Bluetooth communication unit 14 to use the Bluetooth channels included in the group thus selected.

The Wi-Fi communication unit 16 communicates with the Wi-Fi AP 30 that is an external device, and the Bluetooth communication unit 14 communicates with the Bluetooth device 20 that is an external device.

When the Wi-Fi communication unit 16 receives a signal of the Wi-Fi AP 30 to make it possible to know the channel to be used for communication with the Wi-Fi AP 30, the control unit 12 may receive the channel information from the Wi-Fi communication unit 16 and thus determine frequency channels to be used by the Bluetooth apparatus among the groups including the first, second, and third groups. Referring to the example shown in FIG. 5, since the channel used for communication with the Wi-Fi AP 30 is channel 1, the Bluetooth communication unit 14 may avoid interference by using channels included in the second group or the third group.

Figure 6:
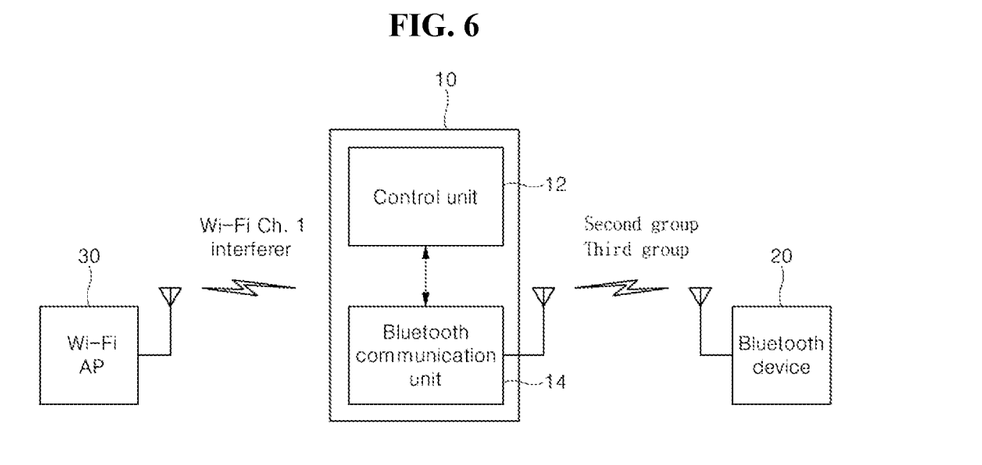
FIG. 6 is a block diagram illustrating a Bluetooth apparatus according to another embodiment of the present invention.

FIG. 6 is a block diagram illustrating a Bluetooth apparatus 10 according to another embodiment of the present invention.

Referring to FIG. 6, the Bluetooth apparatus 10 according to the present invention may be configured to include the control unit 12 and the Bluetooth communication unit 14. Compared with the configuration of FIG. 5, the Bluetooth apparatus 10 according to the present embodiment is configured without the Wi-Fi communication unit 16.

The Bluetooth apparatus 10 may be an independent apparatus, and may be an apparatus, a device, a module, and a system-on-chip (SoC), but not limited thereto, provided in various devices such as a mobile phone, a smart phone, a computer, a tablet, PC, and the like.

The control unit 12 controls the Bluetooth communication unit 14, and divides the Bluetooth channels into at least three groups including a first group, a second group, and a third group and select one from among the divided groups as described with reference to FIG. 3 and FIG. 4. The control unit 12 may cause the Bluetooth communication unit 14 to use the Bluetooth channels included in the group thus selected.

There are two methods for the control unit 12 to select the Bluetooth channel group as follows.

First, since the channel of the Wi-Fi AP 30 in a home or a small office is often known by the user, the user my directly input information on a Wi-Fi channel in use. Then, the control unit 12 receives the information on the Wi-Fi channel in use and may select a Bluetooth channel group that does not overlap with a Wi-Fi channel band in use, on a basis of the received information.

Second, when the user may not know the channel of the Wi-Fi AP in advance, he or she may set the frequency band of the Bluetooth by utilizing a channel assessment algorithm used in an adaptive frequency hopping of the Bluetooth standard. The channel determination algorithm is a function preceded by an adaptive frequency hopping that is operated in such a manner to discriminate a channel that is subject to strong interference to be excluded from channels to be used for frequency hopping. Therefore, the control unit 12 may select one from among the Bluetooth channel groups using the channel determination algorithm.

With reference with an example shown in FIG. 6, when the control unit 12 receives or determines that the channel used for communication with the Wi-Fi AP 30 is channel 1, the Bluetooth communication unit 14 may avoid interference by using channels included in the second group and the third group.

Figure 7:
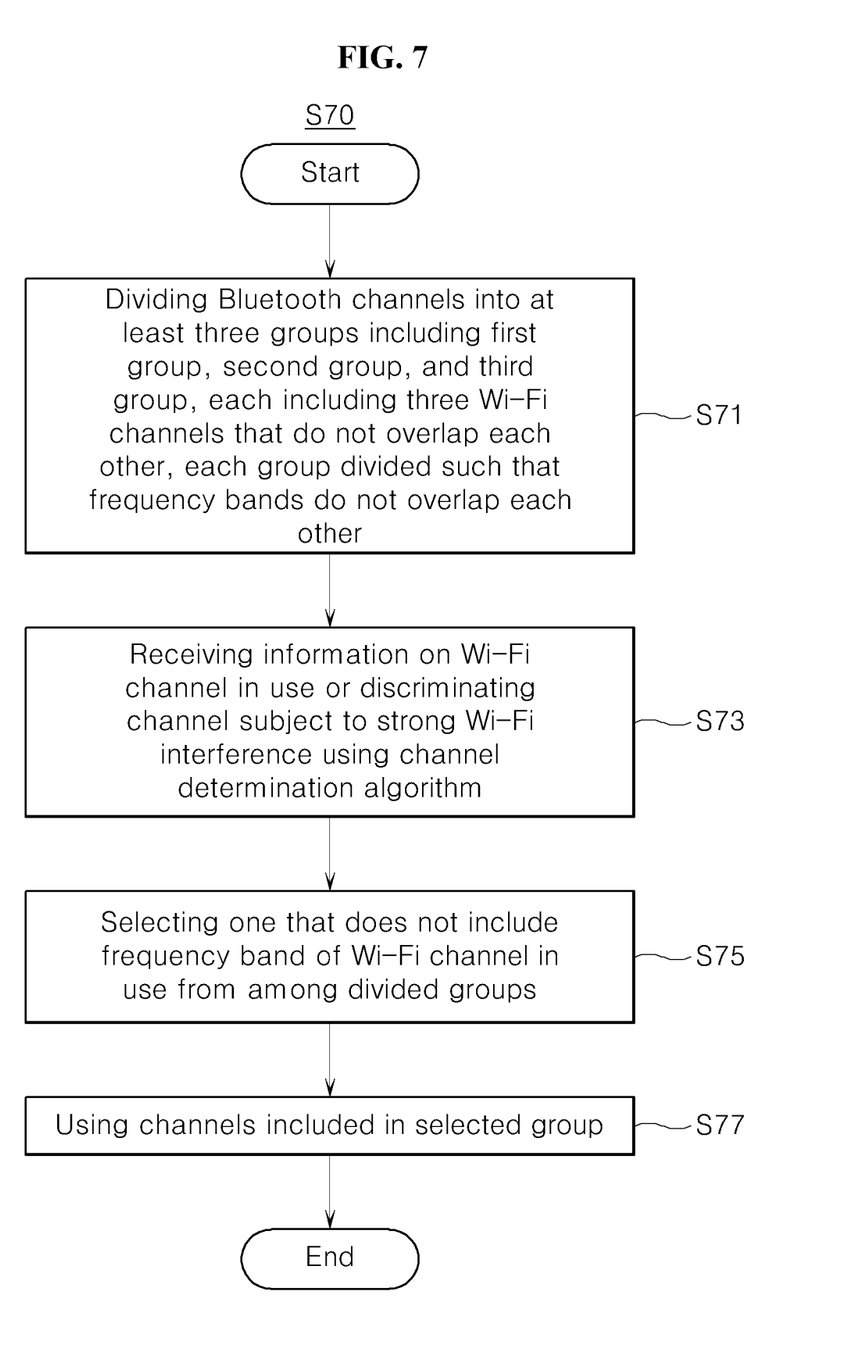
FIG. 7 is a flowchart illustrating a specific example of a method of avoiding Wi-Fi interference using channel structure characteristics according to another embodiment of the present invention.

FIG. 7 is a flowchart S70 illustrating a specific example of a method of avoiding Wi-Fi interference using channel structure characteristics according to another embodiment of the present invention.

In step S71, the Bluetooth channels are divided into at least three groups including a first group, a second group, and a third group, and the respective first, second, and third groups include the respective frequency bands of three Wi-Fi channels that do not overlap each other, in which each group may be divided such that frequency bands do not overlap each other. Also, the data channel and the advertising channel may be divided into separate groups.

In step S73, as described in the embodiment of FIG. 6, it is possible to receive the information on the Wi-Fi channel in use or to discriminate a channel that is subject to strong Wi-Fi interference using a channel determination algorithm. In addition, when the Bluetooth apparatus 10 is provided with the Wi-Fi communication unit 16 as in the embodiment of FIG. 5, the information on the Wi-Fi channel in use may be received from the Wi-Fi communication unit 16.

In step S75, it is possible to select one that does not include the frequency band of the Wi-Fi channel in use from among at least three Bluetooth channel groups, on a basis of the information received in step S73.

In step S77, the Bluetooth communication may be performed using the channels included in one Bluetooth channel group that is selected in step S75.

As described above, according to the present embodiments, the Bluetooth channels are divided into a plurality of groups on a basis of frequency band structure and occupancy characteristics, and channels of a group that does not include the frequency band of the Wi-Fi channel in use are caused to be used for Bluetooth communication, whereby there is an advantage of solving a problem of an unnecessary connection delay caused in a conventional Bluetooth apparatus using methods such as a channel quality value calculation and frequency hopping.

In addition, the respective groups of Bluetooth channels include respective frequency bands of three Wi-Fi channels that do not overlap each other, in which the respective groups are divided such that frequency bands do not overlap each other. Accordingly, there is an advantage that at least one group is not subject to interference caused by any certain Wi-Fi channel to allow a Bluetooth channel to be easily and quickly assigned. Accordingly, this is particularly effective to be used in homes or small offices that use Wi-Fi AP of single frequency.

While the present invention has been particularly shown and described with reference to exemplary embodiments thereof, it is evident that many alternatives, modifications and variations can be readily made by those of ordinary skill in the art. Accordingly, the true scope of the present invention should be determined by the technical idea of the appended claims.

The invention claimed is:

1. A Bluetooth apparatus, the apparatus comprising:
   a Wi-Fi communication unit configured to use a Wi-Fi channel;
   a control unit configured to:
      divide Bluetooth channels into a plurality of divided groups including a first group, a second group, and a third group,
      receive information of the Wi-Fi channel in use by the Wi-Fi communication unit, and
      select a divided group from among the divided groups on a basis of the received information of the Wi-Fi channel in use, wherein the selected divided group does not include a frequency band of the Wi-Fi channel used by the Wi-Fi communication unit; and
   a Bluetooth communication unit configured to use channels included in the selected divided group.

2. The apparatus according to claim 1,
   wherein the first, second, and third groups include respective Wi-Fi channels that are non-overlapped with each other, in which the divided groups are non-overlapped with each other in frequency.

3. The apparatus according to claim 1,
   wherein the control unit discriminates a channel that is subject to strong Wi-Fi interference using a channel assessment algorithm and selects one from among the divided groups on a basis of the discriminated channel information.

4. A method of avoiding Wi-Fi interference, the method comprising:
   dividing Bluetooth channels into a plurality of divided groups including a first group, a second group, and a third group;
   receiving information of a Wi-Fi channel in use;
   selecting a divided group among the plurality of divided groups based on the information of the Wi-Fi channel in use, wherein the selected divided group does not include a frequency band of the Wi-Fi channel in use; and
   using a channel included in the selected divided group.

5. The method according to claim 4, wherein the first, second, and third groups include respective Wi-Fi channels that are non-overlapped with each other, in which the divided groups are non-overlapped with each other in frequency.

6. The method according to claim 4, further comprising:
discriminating a channel that is subject to strong Wi-Fi interference using a channel assessment algorithm,
wherein the selecting is performed by selecting one from among the divided groups on a basis of the discriminated channel information.

\* \* \* \* \*